United States Patent [19]

Kohn et al.

[11] Patent Number: 5,242,997
[45] Date of Patent: Sep. 7, 1993

[54] POLY(N-PHENYL URETHANE) FROM POLY(N-SUBSTITUTED IMINOCARBONATE)

[75] Inventors: Joachim B. Kohn, Highland Park; Chun Li, Piscataway, both of N.J.

[73] Assignee: Rutgers, The State University of New Jersey, New Brunswick, N.J.

[21] Appl. No.: 978,787

[22] Filed: Nov. 19, 1992

Related U.S. Application Data

[62] Division of Ser. No. 609,204, Nov. 5, 1990, Pat. No. 5,194,570.

[51] Int. Cl.$^5$ .............................................. C08G 67/00
[52] U.S. Cl. ...................................... 525/534; 528/44
[58] Field of Search ........................... 525/534; 528/44

[56] References Cited

U.S. PATENT DOCUMENTS 5,194,570  3/1993  Kohn et al. ........................ 528/211

Primary Examiner—Harold D. Anderson
Attorney, Agent, or Firm—Lerner, David, Littenberg, Krumholz & Mentlik

[57] ABSTRACT

Poly(N-phenyl urethanes) and methods of preparing same by heating poly(N-phenyl iminocarbonates) to a temperature above 250° C. so that the backbone of the polyiminocarbonate rearranges to form the poly(N-phenyl urethane). Poly(N-substituted iminocarbonates and methods of preparing same by suspending a dialkaline diphenol in an aprotic solvent at a basic pH and adding to the suspension an N-substituted iminophosgene. Methods for making heat-stable articles by forming an article from a poly(N-phenyl iminocarbonate) while heating the article to a temperature above about 250° C. so that the poly(N-phenyl iminocarbonate) rearranges to form a poly(N-phenyl urethane).

14 Claims, No Drawings

POLY(N-PHENYL URETHANE) FROM POLY(N-SUBSTITUTED IMINOCARBONATE)

This is a division of application Ser. No. 07/609,204 filed Nov. 5, 1990, now U.S. Pat. No. 5,194,570.

BACKGROUND OF THE INVENTION

The present invention relates to poly(N-phenyl urethanes), to methods of preparing same from poly(N-phenyl iminocarbonates), and to poly(N-substituted iminocarbonates) in general, and to methods of preparing same.

Unsubstituted polyurethanes carry a moderately reactive —NH— group in their backbone that severely limits the polymer's thermal stability. The thermal stability of polyurethanes can be increased by the replacement of the NH proton by an alkyl or aromatic substituent. In particular, fully aromatic polyurethanes, such as, for instance, poly(Bisphenol A N-phenyl urethane) would be a mechanically strong material stable at very high temperatures.

Poly(N-substituted urethanes) have been prepared as disclosed in Mukaiyama et al., *J. Org. Chem.*, 27, 3337 (1962), Fujisawa et al., *Bull. Chem. Soc. Japan*, 37(6), 793 (1964) and *Macromolecular Syntheses*, Vol. 4 (W. J. Bailey, ed., John Wiley and Sons 1972) pp. 105–108. However, these polymers have been limited to ethylene N-substituted urethanes prepared by the ring-opening polymerization of cyclic ethylene N-substituted iminocarbonates. This method is unsuitable for the preparation of fully aromatic polymers containing commercially desirable diphenolic monomers that are incapable of forming cyclic iminocarbonates.

Poly(N-substituted urethanes) have also been prepared by the condensation polymerization of dichloroformates with substituted diamines as disclosed in U.S. Pat. No. 3,373,139 to Morgan:

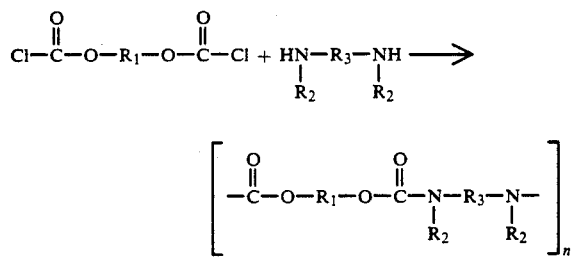

Although a variety of poly(N-alkyl urethanes) have been prepared in this way, poly(N-phenyl urethanes) are not as readily accessible because of the high cost and limited availability of the required N-phenyl diamines. Thus, an alternative method for the synthesis of fully aromatic polyurethanes would be of considerable practical utility.

With respect to the poly(N-phenyl iminocarbonates) from which the poly(N-phenyl urethanes) are prepared co-pending patent application Ser. No. 219,290, now U.S. Pat. No. 4,980,449 describes polyiminocarbonates generally useful as degradable polymers, having unsubstituted imino nitrogens. The disclosure of polyiminocarbonates and methods of synthesizing polyiminocarbonates in said U.S. patent application Ser. No. 219,290 is hereby incorporated herein by reference thereto.

A drawback to the polyiminocarbonates of U.S. patent application Ser. No. 219,290 is that the imino group is heat sensitive with thermal decomposition temperatures ($T_d$) close to the glass transition temperatures ($T_g$) of the polymer. Most of the polyiminocarbonates of U.S. patent application Ser. No. 219,290 lack sufficient thermal stability to be compression molded and must be formed to the desired shape without using heat to soften or melt the polymer.

SUMMARY OF THE INVENTION

It has now been determined that the thermal stability of the polyiminocarbonates of U.S. patent application Ser. No. 219,290 can be improved by N-substitution of the imino group. Poly(N-alkyl iminocarbonates) and poly(N-phenyl iminocarbonates) have been prepared, and determined to have $T_d$'s higher than the unsubstituted polyiminocarbonates of U.S. patent application Ser. No. 219,290, and sufficiently above the polymer $T_g$ to permit injection molding.

It has further been determined that at elevated temperatures, the poly(N-phenyl iminocarbonates) undergo a macromolecular backbone rearrangement to form poly(N-phenyl urethanes), which polymers have $T_d$'s in excess of 500° C. The macromolecular backbone rearrangement of poly(N-phenyl iminocarbonates) represents a new route to the synthesis of poly(N-phenyl urethanes).

The present invention provides a method for the preparation of poly(N-phenyl urethanes) without the use of cyclic iminocarbonate or N-phenyl diamine starting materials. Instead, new and useful poly(N-phenyl iminocarbonates) are used as starting materials in the preparation of poly(N-phenyl urethanes).

Therefore, according to one aspect of the present invention, methods are provided for the preparation of poly(N-phenyl urethanes) from poly(N-phenyl iminocarbonates) by rearrangement of the polymer backbone. Methods for the preparation of poly(N-phenyl urethanes) according to the present invention include the steps of heating a poly(N-phenyl iminocarbonate) to a temperature above about 250° C. so that the backbone of the polyiminocarbonate rearranges to form a poly(N-phenyl urethane); and recovering the poly(N-phenyl urethane). Preferred processes according to the above-mentioned aspects of the invention utilize poly(N-phenyl iminocarbonates) derived from diphenol starting materials and yield aromatic poly(N-phenyl urethanes) that are strong and hydrolytically stable.

Further aspects of the present invention provide poly(N-phenyl urethanes) prepared according to the methods of the present invention by heating a poly(N-phenyl iminocarbonate) to a temperature above about 250° C. so that the backbone of the polymer rearranges to form poly(N-phenyl urethane). The poly(N-phenyl urethanes) according to this aspect of the present invention have absolute weight-average molecular weights typically above about 63,500 daltons and higher, determined from low angle laser light scattering.

The poly(N-phenyl iminocarbonate) rearrangement methods of the present invention give rise to a random sequence of head-tail and tail-tail poly(N-phenyl urethane) configurations in the rearranged polymer. Therefore, according to another aspect of the present invention, poly(N-phenyl urethanes) are provided having first and second recurring structural units, with the first recurring unit having a structure according to Formula Ia:

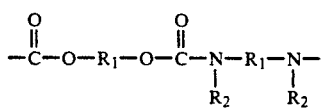

and the second recurring unit having a structure according to Formula Ib:

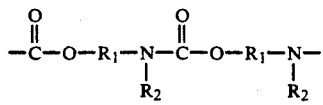

with $R_1$ being a functional group selected from aryl, alkylaryl or aromatic functional groups containing heteroatoms and $R_2$ being a functional group having a benzene ring directly attached to the urethane nitrogen.

Preferred poly(N-substituted urethanes) are those compounds in which $R_1$ has a structure according to Formula II:

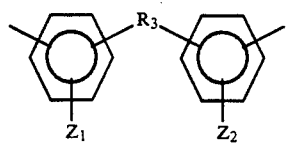

wherein $R_3$ is selected from:

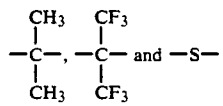

$Z_1$ and $Z_2$ are independently selected from hydrogen, halogen, lower alkyl, carboxyl, nitro, thioether, sulfoxide and sulfonyl, and $R_2$ is an unsubstituted phenyl group. More preferably, $Z_1$ and $Z_2$ are both hydrogen.

Still yet another aspect of the present invention provides a method for forming a heat stable article of poly(N-phenyl urethane) by combining the molding and rearrangement steps into a single process: heating the poly(N-phenyl iminocarbonate) to a temperature above about 250° C. within an appropriate mold so that the poly(N-phenyl iminocarbonate) rearranges to form a poly(N-phenyl urethane), and recovering the formed article.

The poly(N-phenyl iminocarbonates) from which the poly(N-phenyl urethanes) of the present invention are formed are provided by still yet another aspect of the present invention, which aspect provides poly(N-substituted iminocarbonates) in general. The poly(N-substituted iminocarbonates) according to this aspect of the present invention have repeating units according to structural Formula III:

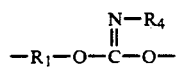

with $R_1$ conforming to the above description with respect to Formulas Ia and Ib and $R_4$ being alkyl, aryl, arylalkyl or functional groups containing heteroatoms. $R_4$ specifically contains the functional groups defined for $R_2$ with respect to Formulas Ia and Ib.

Preferred poly(N-substituted iminocarbonates) are those compounds having $R_1$ according to Formula II above, wherein $R_3$, $Z_1$ and $Z_2$ conform to the above description with respect to Formula II and $R_4$ is an unsubstituted phenyl group.

Polymerization processes for the synthesis of the poly(N-substituted iminocarbonates) of the present invention are provided by yet another aspect of the present invention. A polymerization process according to this aspect of the invention for the synthesis of poly(N-substituted iminocarbonates) includes the steps of suspending a dialkaline salt of a diphenol in an aprotic solvent at a basic pH and adding to the suspension an N-substituted iminophosgene. Processes according to this aspect of the present invention provide high molecular weight poly(N-substituted iminocarbonates) with absolute weight-average molecular weights typically above about 37,500 daltons and higher, determined from low angle laser light scattering.

While not being bound by any particular theory, it is believed that the poly(N-phenyl iminocarbonates) of the present invention when heated above 250° C. undergo a macromolecular backbone rearrangement known as a Chapman rearrangement to form the poly(N-phenyl urethanes) of the present invention. The rearrangement can be followed by Fourier Transform Infrared Spectrophotometry (FT-IR) with the conversion usually occurring within minutes. The poly(N-phenyl urethanes) of the present invention possess high thermal stability with up to 500° C. in air and up to 600° C. in nitrogen as determined by Differential Scanning Calorimetry (DSC) and Thermogravimetric Analysis (TGA). This high thermal stability provides the polymers with heat stability advantages over unsubstituted polyurethanes.

The synthesis of poly(N-phenyl urethanes) by way of a backbone rearrangement of poly(N-phenyl iminocarbonates) represents a new, macromolecular route to the synthesis of poly(N-phenyl urethanes). The process is particularly advantageous because preferred poly(N-phenyl urethanes) according to the present invention are prepared from poly(N-phenyl iminocarbonates) derived from common, commercially available monomers such as Bisphenol A. Existing polymerization facilities can be readily changed over to the production of poly(N-substituted iminocarbonates) for rearrangement according to the present invention to form the preferred poly(N-substituted urethanes) of the present invention.

DETAILED DESCRIPTION OF THE PREFERRED EMBODIMENTS

In the preparation of the poly(N-phenyl urethanes) of the present invention, poly(N-phenyl iminocarbonates) are employed as starting materials.

The poly(N-substituted iminocarbonates) of the present invention including the poly(N-phenyl iminocarbonates) from which the poly(N-phenyl urethanes) of the present invention are derived, are formed by the polymerization reaction involving an N-substituted iminophosgene and a diphenol. The poly(N-substituted iminocarbonates) thus include one or more recurring structural units represented by Formula III disclosed above, in which $R_1$ is a functional group selected from aryl, arylalkyl or aromatic functional groups containing heteroatoms and $R_4$ is a functional group selected from alkyl, aryl, arylalkyl or aromatic functional groups containing heteroatoms, including those functional groups defined for $R_2$ with respect to Formulas Ia and Ib.

Preferred poly(N-substituted iminocarbonates) in the present invention have one or more recurring structural units represented by Formula III in which $R_1$ has a structure according to Formula II wherein $R_3$ is selected from

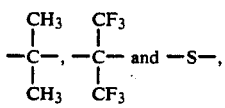

and $Z_1$ and $Z_2$ are independently selected from hydrogen, halogen, alkyl, carboxyl, nitro, thioether, sulfoxide and sulfonyl. Preferably, $Z_1$ and $Z_2$ are both hydrogen. $R_4$ is preferably a functional group having a benzene ring directly attached to the imino nitrogen or an alkyl group having up to about 17 carbon atoms. Most preferably, $R_4$ is an unsubstituted phenyl group.

Typical poly(N-substituted iminocarbonates) prepared according to the method of the present invention have absolute weight-average molecular weights of about 37,500 daltons. Depending upon the purity of the monomeric starting materials, higher or lower molecular weights can be achieved. Molecular weights are determined from low angle laser light scattering.

The poly(N-phenyl iminocarbonates) of the present invention, when heated above about 250° C. undergo a backbone rearrangement to form poly(N-phenyl urethanes) having a random sequence of first and second recurring structural units represented by Formulae Ia and Ib, respectively, in which $R_1$ is a functional group selected from aryl, arylalkyl or aromatic functional groups containing heteroatoms and $R_2$ is a functional group having a benzene ring directly attached to the urethane nitrogen. Preferred poly(N-phenyl urethanes) are those compounds in which $R_1$ has a structure according to Formula II wherein $R_3$ is selected from:

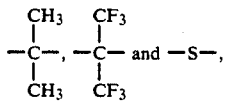

$Z_1$ and $Z_2$ are independently selected from hydrogen, halogen, lower alkyl, carboxyl, nitro, thioether, sulfoxide and sulfonyl, and $R_2$ is an unsubstituted phenyl group. Preferably, $Z_1$ and $Z_2$ are both hydrogen.

In the process of the present invention for polymerizing the poly(N-substituted iminocarbonates) of the present invention, one or more dialkaline diphenol salts are reacted in an aprotic polar solvent at a basic pH with an iminophosgene bearing an N-substituent that will serve as the N-substituent on the iminocarbonate linkage. The N-substituent of the iminophosgene is preferably an alkyl, aryl or arylalkyl functional group, or an aromatic functional group containing heteroatoms. More preferably the N-substituent is a functional group having a benzene ring directly bonded to the nitrogen or an alkyl group having up to about 17 carbon atoms. Most preferably, the N-substituent is an unsubstituted phenyl group. Iminophosgenes are also known as imidocarbonyl chlorides or isocyanide dichlorides.

The dialkaline diphenol is preferably a disodium salt. Exemplary diphenol compounds include those disclosed in U.S. patent application Ser. No. 219,290 and Schminke, U.S. Pat. No. 3,491,060. The disclosure of diphenol compounds useful to form polyiminocarbonates in said U.S. patent application Ser. No. 219,290 and said U.S. Pat. No. 3,491,060 is hereby incorporated herein by reference thereto.

Particularly preferred diphenols for use in the processes according to the present invention for the synthesis of poly(N-substituted iminocarbonates) are the diphenol compounds of Formula IV:

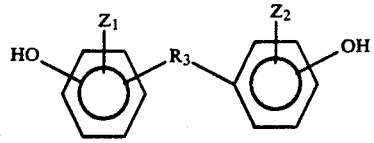

wherein $R_3$, $Z_1$ and $Z_2$ conform to the general and preferred descriptions for $R_3$, $Z_1$ and $Z_2$ for Formula II. Particularly preferred diphenol starting materials include Bisphenol A, 4,4'-bis(hydroxyphenyl) hexafluoroisopropylidene and thiodiphenol.

Preferred aprotic solvents include dimethyl formamide (DMF), N-methyl pyrrolidinone (NMP), dimethyl sulfoxide (DMSO) and mixtures thereof. An aprotic polar solvent at a basic pH is defined as a solvent substantially free of hydrogen or hydronium ions. The aprotic solvents are maintained at a basic pH by utilizing the dialkaline diphenol salts.

The order of addition of the diphenol and the N-substituted iminophosgene is not important, although preferably the diphenol is first suspended in the reaction solvent followed by addition of the N-substituted iminophosgene to the resulting mixture. The mixture may first be warmed, if necessary, prior to the addition of the N-substituted iminophosgene. Preferably, the reaction is performed under an inert atmosphere.

A slight excess of the N-substituted iminophosgene over the diphenol should be used. The molar ratio of iminophosgene to diphenol should be at least about 1.00:1, but preferably, no greater than about 1.10:1. An iminophosgene to diphenol ratio of about 1.02:1 is more preferred. The total solution concentration (W/V%) of both compounds combined typically is about 30% to about 70%, and preferably about 50%.

While poly(N-substituted iminocarbonates) are relatively heat-stable, the reaction temperature should not exceed about 100° C. The reaction temperature should be higher than the solution freezing point. A preferred reaction temperature range is between about room temperature and about 60° C. Most preferred is a reaction temperature between about 40° to about 50° C. By increasing reaction temperature, reaction time is shortened. The reaction typically goes substantially to completion within about 4 hours at about 40°-50° C. Desirably, the product polymer is recovered promptly after completion of the reaction.

Poly(N-substituted iminocarbonates) are completely soluble in NMP, and form a viscous solution as the polymerization progresses to completion. The reaction is terminated and the polymer recovered by pouring the entire reaction mixture into an excess of methanol. The crude polymer, contaminated by sodium chloride salt, precipitates and is collected by filtration. The crude polymer is purified by dissolving in methylene chloride, centrifuging to remove the sodium chloride salt, and filtering through a column packed with celite to remove fine particulates. The clear polymer solution is then reprecipitated with methanol.

The N-substituted iminophosgene is prepared by conventional means by reacting an N-substituted isothiocyanate with chlorine gas in carbon tetrachloride solvent as taught in the above-cited *Macromolecular Syntheses* at pages 105-106, the disclosure of which is hereby incorporated herein by reference thereto.

For the backbone rearrangement of poly(N-phenyl iminocarbonates) to occur, the polymer must be heated to a temperature above 250° C. but less than the thermal decomposition temperature of the poly(N-phenyl urethanes), about 500° C. Preferably, the poly(N-phenyl iminocarbonate) is heated to a temperature between about 280° C. and about 380° C.

At this temperature, the polymer is liquid. The rearrangement occurs rapidly and upon cooling, the molten polymer forms a solid mass of a poly(N-phenyl urethane) possessing high thermal stability. The poly(N-phenyl urethanes) of the present invention are thermally stable in air at temperatures up to 500° C. and in nitrogen at temperatures up to 600° C.

The phenyl substituents of the poly(N-phenyl iminocarbonates) of the present invention capable of rearranging to form poly(N-phenyl urethanes) are defined as functional groups having a benzene ring directly attached to the imine nitrogen. Stated another way, by definition the phenyl groups include substituted phenyl groups. The phenyl groups should not be so highly substituted so as to hinder the rearrangement of the backbone of the poly(N-phenyl iminocarbonate). The identity of substituted phenyl groups suitable for use with the present invention is well known and understood by those of ordinary skill in the art.

The poly(N-phenyl urethanes) of the present invention have absolute weight-average molecular weights of about 63,500 daltons. Depending upon the purity of the monomeric starting materials higher or lower molecular weights can be achieved.

The poly(N-phenyl urethanes) of the present invention are readily formed into a variety of useful articles for end-use applications in which thermal stability is important. The useful articles can be shaped by conventional plastic-forming techniques such as extrusion, compression molding and injection molding. A preferred technique takes advantage of the lower $T_g$ of the poly(N-substituted iminocarbonates) of the present invention, which are suitable in general for compression molding and injection molding. When the poly(N-substituted iminocarbonate) is a poly(N-phenyl iminocarbonate), the polymer can also be converted to poly(N-phenyl urethanes), preferably while the polyiminocarbonate is being formed into a shaped article. The desired article is prepared by forming by compression molding or injection molding from a poly(N-phenyl iminocarbonate) while heating the material to a temperature above 250° C. so that the polyiminocarbonate rearranges to form the poly(N-substituted urethane). Once the formation of the poly(N-substituted urethane) is complete, the article is cooled and then demolded. Because the $T_g$ of poly(N-phenyl iminocarbonates) is lower than the temperature at which the poly(N-phenyl iminocarbonates) rearrange to form poly(N-phenyl urethanes), the article must be retained in a mold during the heating step in order to maintain the desired shape.

The following examples illustrate the present invention and are not intended to limit same. The examples use the following materials, solvents and measurement procedures.

EXAMPLES

Materials

Bisphenol A is available from Shell Chemical Company of Houston, Tex. Chlorine, carbon tetrachloride, phenyl iminophosgene, N-methylpyrolidinone, methylene chloride and methanol are available from Aldrich Chemicals of Milwaukee, Wis. These materials are used without further purification. All solvents are HPLC grade.

Measurements

GPC data are obtained with a Perkin-Elmer HPLC/GPC system consisting of a Model 410 pump, Perkin-Elmer Model LC-235 diode array UV detector, a Waters Model 410 refractive index detector, and the Perkin-Elmer Model 3600 computerized data station. Two PL-GEL GPC columns (300 mm×7.7 mm, particle size 5 micron, pore size $10^3$ angstrom and $10^5$ angstrom, respectively) are placed in series and operated at a flow rate of 1.0 ml/min. in DMF (containing LiBr) at room temperature. Data are collected relative to polystyrene standards.

The absolute weight average molecular weight (Mw) was determined by low angle laser light scattering (LALLS) on a Chromatix KMX-6 at 25° C. in DMF. Intrinsic viscosity ($\eta$) was measured with an Ubbelohde type viscometer at 30° C. in chloroform.

Mechanical Properties

Thin films are prepared by solvent casting from a 10% (W/V) solution in methylene chloride at room temperature. After allowing the films to dry in a slow stream of nitrogen overnight, the films are further dried in vacuum to constant weight (20 days). Samples about 0.15 mm thickness, 40 mm length and about 5-6 mm width are cut from the films and used for mechanical testing. Tensile strength, tensile modulus, elongation at yield and break are determined on an Instron Tensile Tester Model 1122 at room temperature according to ASTM D882-83. Tensile values are calculated from the average of at least four measurements obtained from four separate specimens per polymer sample.

Thermal Properties

A DuPont 910 Differential Scanning Calorimeter (DSC) calibrated with indium is used to evaluate the thermal properties of polymer samples. The heating rate is 10° C./min. The thermal stability is determined on a DuPont 951 Thermogravimetric Analyzer (TGA) at a heating rate of 20° C./min under an atmosphere of nitrogen or air.

EXAMPLE 1

Preparation of Bisphenol A (BPA) Disodium Salt

A solution of sodium ethoxide (1 M) is prepared by the addition of 15.6 g of sodium into 680 mL of absolute ethanol. The concentration of sodium ethoxide is determined by titration with standard HCl using Phenol Red as the indicator. The sodium ethoxide solution is neutralized by the addition of an exactly equimolar amount of Bisphenol A (BPA). Thereafter, the solution is evaporated to dryness. The solid residue is rapidly crushed to a white powder and dried at 60° C. under high vacuum to constant weight, with care taken to avoid oxidation of the BPA disodium salt by atmospheric oxygen. Yield 80 g (98%).

EXAMPLE 2

Preparation of Poly(BPA N-Phenyl Iminocarbonate)

Under an atmosphere of nitrogen, 29.97 g of the finely powdered BPA disodium salt of Example 1 (0.110 mole) and 85 mL of anhydrous NMP is added into a three necked flask. The resulting suspension is warmed to 45° C. 19.35 g of phenyl iminophosgene (0.111 mole) is slowly added into the well stirred suspension over a period of 40 min. Stirring is continued for an additional 3.5 hours. The disodium salt slowly dissolves. The solution turns brown and becomes viscous. The reaction mixture is diluted with 120 mL of methylene chloride and the reaction is terminated by dropping the mixture into 1 L of methanol. The crude polymer, contaminated by sodium chloride, precipitates and is collected by filtration. Yield 28.2 g (78%). For purification, the polymer is dissolved in methylene chloride and NaCl particles are removed by centrifugation. Last traces of particulate matter are removed by filtering the solution through a celite column. The clear polymer solution is then reprecipitated into methanol. Recovery 23 g (81%). The resulting poly(BPA N-phenyl iminocarbonte) has a weight average molecular weight of 85,000 da (GPC, relative to polystyrene standards).

Confirmation of the Chemical Structure of Poly(BPA N-Phenyl Iminocarbonate

The chemical structure of the poly(BPA N-phenyl iminocarbonate) of Example 2 is investigated by IR and $^1$H-NMR spectroscopy. The IR spectrum (film on NaCl) shows a strong peak at 1691 cm$^{-1}$. In analogy to the characteristic C=N absorption of unsubstituted poly(BPA iminocarbonate) at about 1675 cm$^{-1}$, the absorption at 1691 cm$^{-1}$ is assigned to the C=N—Ph stretching mode of poly(BPA N-phenyl iminocarbonate). Aromatic bending modes characteristic of both p-substitution (833 cm$^{-1}$) and monosubstitution (758 cm$^{-1}$, 695 cm$^{-1}$) are also observed. Whereas the IR spectrum of poly(BPA iminocarbonate) has a strong and sharp band at 3335 cm$^{-1}$ due to the N—H stretching mode, poly(BPA N-phenyl iminocarbonate) has no absorptions above 3000 cm$^{-1}$.

In the $^1$H-NMR spectrum of poly(BPA N-phenyl iminocarbonate), the aromatic protons have chemical shifts in the range of 7.01 to 7.28 ppm. The CH$_3$ proton resonance of the methyl groups of BPA is at 1.62 ppm. These chemical shifts are very close to those observed in the $^1$H-NMR spectrum of unsubstituted poly(BPA iminocarbonate). As expected, the N—H resonance at 5.79 ppm observed in unsubstituted poly(BPA iminocarbonate) is not seen in the spectrum of poly(BPA N-phenyl iminocarbonate), $^{13}$C-NMR shows 11 distinct carbon absorptions, corresponding to the 11 chemically non-equivalent carbon atoms present in the repeat unit of the polymer. The spectral evidence confirms that the polymer obtained from the reaction of N-phenyl iminophosgene and BPA is poly(BPA N-phenyl iminocarbonate).

Material Properties

A DSC thermogram of the polymer shows a large exotherm with an onset at 305° C. although TGA shows that the polymer does not lose any weight up to 504° C. in air. Poly(BPA N-phenyl iminocarbonate) is easily soluble in most organic solvents, including methylene chloride, chloroform, tetrahydrofuran, N,N-dimethylformamide, toluene and carbon tetrachloride. Solvent cast films of poly(BPA N-phenyl iminocarbonate) are clear and transparent. X-ray crystallographic analysis shows no crystalline domains, indicating that the films are completely amorphous. This is confirmed by a DSC thermogram showing a lack of melting endotherm. As shown in Table I, even at a relatively low molecular weight, the films exhibit a high degree of mechanical strength. In this respect, poly(BPA N-phenyl iminocarbonate) is very similar to unsubstituted poly(BPA iminocarbonate) which had previously been identified as a strong polymer with low ductility. This observation is particularly noteworthy in view of the high ductility of the closely related poly(BPA carbonate). The glass transition temperature (Tg) of poly(BPA N-phenyl iminocarbonate) at 111° C. is between the Tg of unsubstituted poly(BPA iminocarbonate) (69° C.) and poly(BPA-carbonate) (150° C.). The molecular weight data is shown in Table II.

EXAMPLE 3

Rearrangement of Poly(BPA N-Phenyl Iminocarbonate) to Poly(BPA N-Phenyl Urethane)

Samples of 0.5 g of the poly(BPA N-phenyl iminocarbonate) of Example 2 are placed into 25 mL ampules. After flushing with nitrogen, the ampules are heated to either 130° C., 200° C. or 305° C. After predetermined heating times the ampules are cooled and the heat treated polymer samples are analyzed by GPC and FT-IR. At 130° C., no changes in the molecular weight are observed. The polymer remains physically unchanged and the FT-IR spectra before and after heat treatment are indistinguishable. At 200° C., the molecular weight of the polymer increases, but no structural changes are detectable by FT-IR over a period of 120 min. At 305° C., which is the onset temperature of the exotherm revealed by DSC, the molecular weight changes within 5 min and nearly doubles after 120 min of heating. The polydispersity of the polymer remains virtually constant during heat treatment. No low molecular weight degradation products are detectable. These observations exclude the occurrence of massive backbone degradation during heat treatment.

The molecular weight data obtained by GPC relative to polystyrene standards are not corrected for possible changes in the hydrodynamic volume of the polymer during heat treatment. It is therefore not clear whether the degree of polymerization indeed increased during heat treatment as indicated by the GPC data. In order to further investigate this point, the absolute weight average molecular weight of the polymer prior to and after heat treatment is determined by low angle laser light scattering (LALLS). LALLS results shown in Table II establishes unambiguously that the molecular weight of the polymer increases during heat treatment. Thus, the strong exotherm observed in the DSC thermogram of poly(BPA N-phenyl iminocarbonate) is associated with a thermal rearrangement reaction and not with a thermal decomposition reaction.

Confirming this conclusion, a gradual structural change is observed in polymer samples exposed to 305° C. The characteristic $V_{C=N}$ absorption of poly(BPA N-phenyl iminocarbonate) at 1690 cm$^{-1}$ decreases while a new peak at 1730 cm$^{-1}$ emerges. This peak is attributable to the aromatic carbonyl $V_{C=O}$ stretching mode. Peaks at 1240 cm$^{-1}$ and 986 cm$^{-1}$ assigned to the iminocarbonate bond also decrease. New peaks at 1336 cm$^{-1}$ and 1302 cm$^{-1}$ are assigned to the $V_{C-O}$ and $V_{C-N}$ absorptions and provide supporting evidence for the formation of aromatic urethane bonds. The corresponding $V_{Ar-O}$ and/or $V_{Ar-N}$ stretching absorptions are observed around 1214 cm$^{-1}$. These results provide spectral evidence for the occurrence of a clean and well-defined thermal rearrangement reaction leading to the formation of poly(BPA N-phenyl urethane).

In the $^{13}$C-NMR spectrum of poly(BPA N-phenyl urethane), 15 distinct peaks are observed corresponding to the 15 chemically nonequivalent carbon atoms present in the repeat unit of the polymer.

Material Properties of Poly(BPA N-Phenyl Urethane)

Poly(BPA N-phenyl urethane) dissolves readily in common organic solvents such as tetrahydrofuran, dimethylformamide and all common chlorinated hydrocarbons except carbon tetrachloride. As shown in Table I, it has a Tg of 171° C. which is about 60° C. higher than the Tg of poly(BPA N-phenyl iminocarbonate). An important property of poly(BPA N-phenyl urethane) is its high thermal stability: As determined by TGA, the polymer starts to lose weight only at 504° C. in air and decomposes without charring. Under nitrogen, the onset of weight loss is at 538° C. and about 20% of char remained at 600° C. Using DSC, the onset of the polymer decomposition exotherm is observed at about 490° C. (air, open pan).

As shown in Table I, poly(BPA N-phenyl urethane) is a strong polymer whose mechanical strength was comparable to the strength of poly(BPA carbonate) and poly(BPA iminocarbonate).

mined by titration using standard solution of hydrogen chloride (0.1 N) in the presence of Phenol Red as indicator. The sodium ethoxide solution is neutralized by the addition of an exactly equimolar amount of 6F-BPA. Thereafter, the solution is evaporated to dryness. The solid residue is rapidly crushed to a white powder and dried at 60° C. under high vacuum to constant weight. Care must be taken to avoid oxidation of the 6F-BPA disodium salt by atmospheric oxygen.

EXAMPLE 5

Preparation of Poly(6F-BPA N-phenyl iminocarbonate)

Under an atmosphere of nitrogen, 1.5564 g of finely powdered 6F-BPA disodium salt (4.092 mmole) and 4 mL of anhydrous NMP are added into a three necked flask. 0.7394 g of N-phenyl iminophosgene (4.174 mmole) is slowly added into the well-stirred suspension over a period of 10 min. Stirring is continued for an additional 1.5 hours. The disodium salt slowly dissolves. The solution turns brown. The reaction is terminated by adding the reaction mixture into 50 mL of methanol. The precipitate is collected and dried. Yield 1.1 g (62%). The crude polymer is purified by precipitating a methylene chloride solution of polymer into methanol. Mw 30,000 (GPC, relative to polystyrene standards). IR (film on NaCl) 1701 cm$^{-1}$ ($V_{C=N}$). Poly (6F-BPA N-phenyl iminocarbonate) dissolves in all common organic solvents. Glass transition temperature (Tg): 120° C.

EXAMPLE 6

Rearrangement of Poly (6F-BPA N-Phenyl Imino-

TABLE I

Physicomechanical Properties of Related Polymers of Bisphenol A

| Polymer[b] | Tensile Properties[c] | | Elongation[c] | | Thermal Properties[d] | |
|---|---|---|---|---|---|---|
| | Strength kg/cm$^2$ | Modulus kg/cm$^2$ | Yield % | Break % | Tg °C. | Td °C. |
| polycarbonate (35,000)[a] | 625 | 22,000 | 5-7 | 100 | 149 | >350 |
| polyiminocarbonate (100,000) | 500 | 21,500 | 3.5 | 4.0 | 69 | 135 |
| poly(N-phenyliminocarbonate) (85,000) | 550 | 23,500 | 2.8 | 2.8 | 111 | n/a |
| poly(N-phenylurethane) (96,000) | 567 | 23,800 | 3.4 | 5.5 | 171 | 470-90 |

[a]Commercial Sample.
[b]Numbers in parenthesis refer to the weight average molecular weight as determined by GPC relative to polystyrene standards.
[c]According to ASTM standard D882-83.
[d]$T_g$ and $T_d$ were determined by DSC at 10° C./min. $T_d$ represents the onset of the decomposition exotherm.

TABLE II

| | Molecular Weight Data | | | |
|---|---|---|---|---|
| Polymer | Mw[a] | Mw[b] | [η][c] | n[d] |
| poly(BPA N-phenylimino-carbonate)[e] | 85,000 | 37,500 | 0.263 | 1.56 |
| poly(BPA N-phenylurethane)[f] | 96,000 | 63,500 | 0.398 | 1.57 |

[a]Weight average molecular weight determined by GPC relative to polystyrene standards.
[b]Weight average molecular weight determined by laser light scattering in DMF at 25° C.
[c]Intrinsic viscosity in dL/g, determined in chloroform at 25° C.
[d]Polydispersity calculated from GPC.
[e]Polymer prior to thermal rearrangement.
[f]Polymer after thermal rearrangement.

EXAMPLE 4

Preparation of 4,4'-bis(hydroxyhenyl) hexafluoroisopropylidene (6F-BPA) Disodium Salt A solution of sodium ethoxide ($\sim$1 M) is prepared by adding 15.6 g of sodium into 680 mL of absolute ethanol. The concentration of sodium ethoxide is detercarbonate) to Poly (6F-BPA N-Phenyl Urethane)

The same basic procedure as described for Example 3 is used. The rearrangement occurs at 330° C. The rearranged product has the following properties IR (film on NaCl) 1742 cm$^{-1}$ ($V_{C=O}$). Glass transition temperature (Tg): 176° C. Decomposition temperature ($T_d$, defined as the onset temperature of DSC curve): 409° C. Char yield (TGA, in N$_2$ flow): 65%.

The results show that the backbone rearrangement of poly(N-phenyl iminocarbonate) to poly(N-phenyl urethane) is not limited to BPA derived polymers. A variety of different diphenolic monomers can be used in place of BPA.

The facile macromolecular backbone rearrangement of polyiminocarbonates to polyurethanes thus represents a new route to the synthesis of poly(N-substituted urethanes). The identification of additional macromolecular rearrangement reactions would provide polymer chemistry with a valuable tool for those instances in which a precursor polymer is cheaper and more readily available than the target polymer.

The foregoing description and examples should be understood by one of illustration rather than by one of limitation of the present invention as defined in the claims. As will be appreciated, numerous variations and combinations of the features set forth within the foregoing description and examples can be utilized without departing from the present invention.

What is claimed is:

1. A poly(N-phenyl urethane) comprising first and second recurring structural units wherein said first recurring structural unit is represented by the formula:

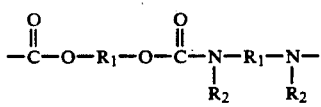

and said second recurring structural unit is represented by the formula:

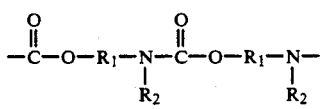

wherein $R_1$ is selected from the group consisting of aryl and arylalkyl functional groups and aromatic functional groups containing one or more heteroatoms, and $R_2$ is a functional group having a benzene ring directly attached to the urethane nitrogen.

2. The poly(N-phenyl urethane) of claim 1, wherein $R_1$ is represented by the formula:

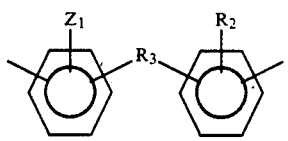

wherein $R_3$ is selected from the group consisting of:

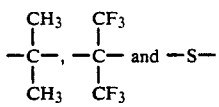

and $Z_1$ and $Z_2$ are independently selected from the group consisting of hydrogen, halogen, alkyl, carboxyl, nitro, thioether, sulfoxide and sulfonyl.

3. The poly(N-phenyl urethane) of claim 2, wherein $Z_1$ and $Z_2$ are both hydrogen.

4. The poly(N-phenyl urethane) of claim 1, wherein $R_2$ is an unsubstituted phenyl group.

5. A process for making a poly(N-phenyl urethane) comprising the steps of heating a poly(N-phenyl iminocarbonate) to a temperature above about 250° C. so that the backbone of said polyiminocarbonate rearranges to form a poly(N-phenyl urethane) and recovering said poly(N-phenyl urethane).

6. The process of claim 5, wherein said heating step is performed at a temperature between about 280° C and about 380° C.

7. The process of claim 5, wherein said heating step is performed under an inert atmosphere.

8. The process of claim 5, wherein said poly(N-phenyl iminocarbonate) comprises one or more recurring structural units represented by the formula:

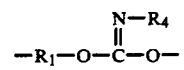

and said poly(N-phenyl urethane) comprises first and second recurring structural units wherein said first recurring structural unit is represented by the formula:

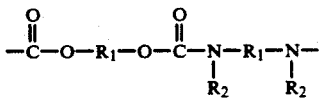

and said second recurring structural unit is represented by the formula:

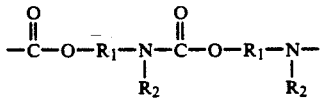

wherein $R_1$ is selected from the group consisting of aryl and arylalkyl functional groups and aromatic functional groups containing one or more heteroatoms, and $R_2$ and $R_4$ are functional groups having a benzene ring directly bonded to the nitrogen atom.

9. The process of claim 8, wherein $R_1$ is represented by the formula:

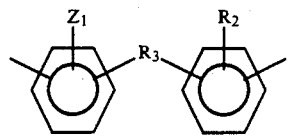

wherein $R_3$ is selected from the group consisting of:

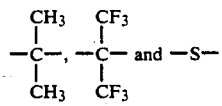

and $Z_1$ and $Z_2$ are independently selected from the group consisting of hydrogen, halogen, alkyl, carboxyl, nitro, thioether, sulfoxide and sulfonyl.

10. The process of claim 9, wherein $Z_1$ and $Z_2$ are both hydrogen.

11. The process of claim 8, wherein $R_2$ and $R_4$ are unsubstituted phenyl groups.

12. A poly(N-phenyl urethane) made by a process as claimed in claim 5.

13. A heat stable article comprising the poly(N-phenyl urethane) of claim 1.

14. A heat stable article comprising the poly(N-phenyl urethane) prepared by the process of claim 5.

* * * * *

UNITED STATES PATENT AND TRADEMARK OFFICE
CERTIFICATE OF CORRECTION

PATENT NO. : 5,242,997
DATED : September 7, 1993
INVENTOR(S) : Kohn et al.

It is certified that error appears in the above-identified patent and that said Letters Patent is hereby corrected as shown below:

Column 1, line 24, "J. Org. Chem.," should read --J. Org. Chem.,--.

Column 1, line 59, after "prepared" insert --,--.

Column 11, line 63, "4,4'bis(hydroxyhenyl)" should read --4,4'-bis(hydroxyphenyl)--.

Column 13, line 39, under claim 2, in the formula, "$R_2$" should read --$Z_2$--.

Column 14, line 39, under claim 9, "$R_2$" should read --$Z_2$--.

Signed and Sealed this

Twenty-sixth Day of April, 1994

Attest:

BRUCE LEHMAN

*Attesting Officer*  *Commissioner of Patents and Trademarks*